United States Patent [19]

Moya

[11] Patent Number: 4,490,021

[45] Date of Patent: Dec. 25, 1984

[54] OPTICAL FILTERING ELEMENT AND A SPECTRAL REFINING DEVICE INCLUDING THE SAME

[75] Inventor: François Moya, Orsay, France

[73] Assignee: Quantel S.A., Orsay, France

[21] Appl. No.: 925,528

[22] Filed: Jul. 17, 1978

[30] Foreign Application Priority Data

Jul. 21, 1977 [FR] France ............................. 77 22405

[51] Int. Cl.³ .......................... G02B 5/18; H01S 3/08
[52] U.S. Cl. .......................... 350/162.23; 350/162.20; 372/20; 372/102
[58] Field of Search .................. 350/162 R, 311, 319, 350/162.17, 162.20, 162.23; 331/94.5 C, 94.5 D, 94.5 L; 372/20, 99, 102, 107

[56] References Cited

U.S. PATENT DOCUMENTS

| | | | |
|---|---|---|---|
| 3,443,243 | 5/1969 | Patel | 331/94.5 C |
| 3,675,990 | 7/1972 | Kogelnik et al. | 350/311 |
| 3,872,407 | 3/1975 | Hughes | 331/94.5 C X |
| 3,959,739 | 5/1976 | Hutcheson et al. | 331/94.5 C |
| 4,028,636 | 6/1977 | Hughes | 331/94.5 C |
| 4,123,149 | 10/1978 | Chenausky et al. | 331/94.5 L X |
| 4,127,828 | 11/1978 | Klauminzer | 331/94.5 C |
| 4,229,710 | 10/1980 | Shoshan | 331/94.5 C |
| 4,287,486 | 9/1981 | Javan | 372/20 |

FOREIGN PATENT DOCUMENTS

| | | | |
|---|---|---|---|
| 2236505 | 1/1974 | Fed. Rep. of Germany | 331/94.5 C |
| 2704273 | 8/1977 | Fed. Rep. of Germany | 331/94.5 C |

OTHER PUBLICATIONS

Eesley et al., "Dye-Laser Cavity Employing a Reflective Beam Expander", *IEEE J. Quantum Elect.*, vol. QE-12, No. 7, Jul. 1976, pp. 440-442.
Krasinski et al., "High Dispersion Rutile Prism For Tuning Dye Lasers", *Rev. Scient. Instr.*, vol. 47, No. 10, Oct. 1976, pp. 1293-1295.
Wolinski et al., "Selecting the Lines Emitted by $Ar^{1+}$ Laser Using a Littrow Prism", *Electron Technology*, vol. 6, 1973, pp. 195-200.
Jain et al., "Diffraction Grating Use to Reject Flourescence ... ", *Appl. Optics*, vol. 14, No. 4, Apr. 1975, pp. 811-812.
Hanna et al., "A Simple Beam Expander For Frequency Narrowing ... ", *Optical & Quant. Elect.*, vol. 7, No. 2, Mar. 1975, pp. 115-119.
Okada et al., "Tilted Birefringent Fabry-Perot Etalon For Tuning Dye Lasers", *Appl. Optics*, vol. 15, No. 2, Feb. 1976, pp. 472-476.
Yamaguchi et al., "Room Temperature Q-Switched Liquid Laser", *Japan J. Appl. Phys.*, vol. 7, No. 2, Feb. 1968, p. 179.
Bradley et al., "Characterisics of Organic Dye Lasers . . . ", *IEEE J. of Quantum Elect.*, vol. QE-4, No. 11, Nov. 1968, pp. 707-711.
Strome et al., "Flashtube-Pumped Dye Laser With Multiple-Prism Tuning",*Appl. Optics*, vol. 10, No. 6, Jun. 1971, pp. 1348-1353.
Hänsch, "Repetitively Pulsed Tunable Dye Laser . . . ", *Applied Optics*, vol. 11, No. 4, Apr. 1972, pp. 895-898.

*Primary Examiner*—John Lee
*Attorney, Agent, or Firm*—Holman & Stern

[57] ABSTRACT

A filtering element for a beam of coherent light, comprising a diffraction grating placed in the path of the beam and disposed with respect to the direction of the beam in such manner that the angle of incidence of the beam is at least equal to 80° and different from the angle of diffraction. At least one additional optical element is placed in the path of a component of the beam diffracted by said grating for returning to the grating a part of the light of said component.

15 Claims, 4 Drawing Figures

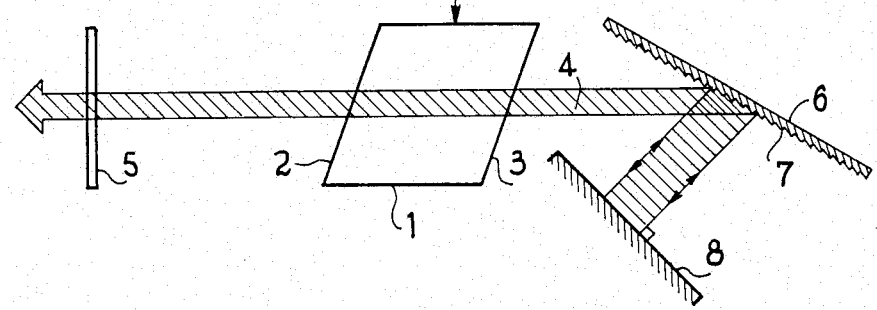
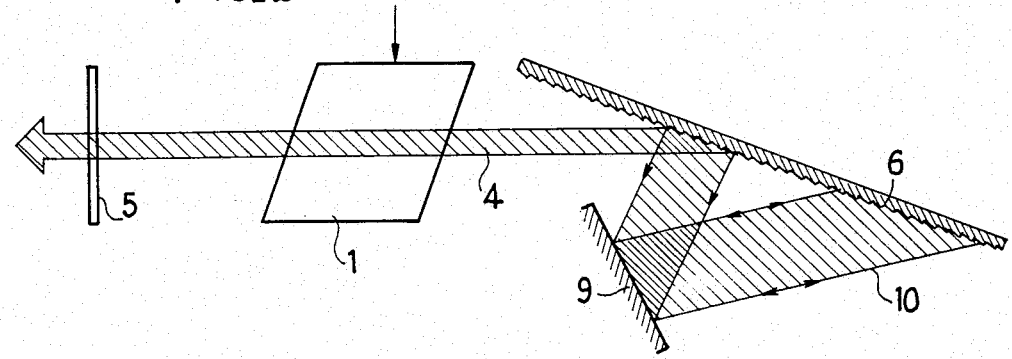
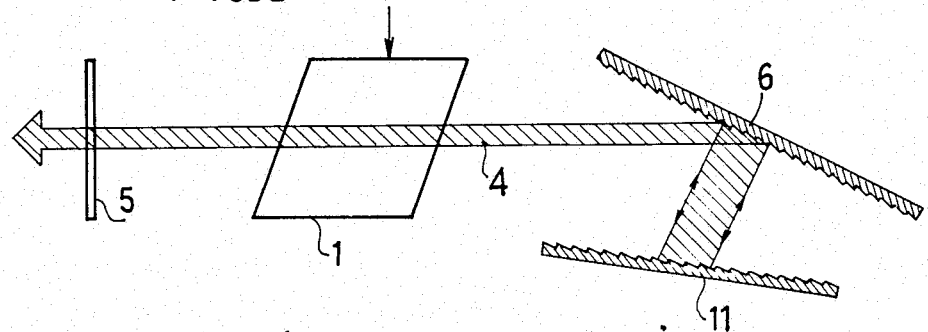
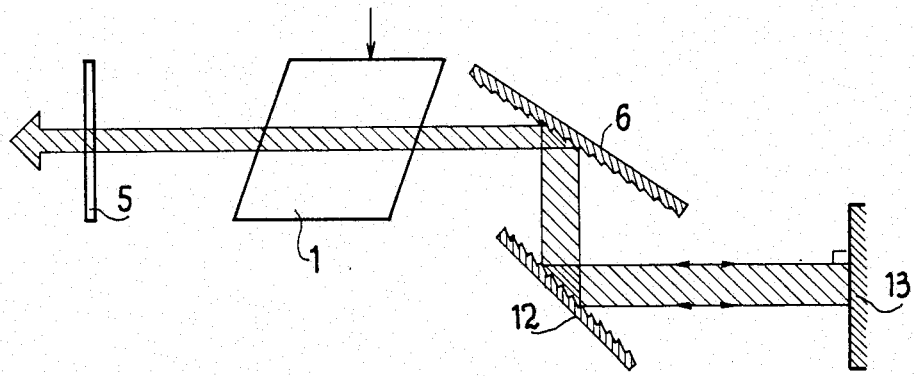

OPTICAL FILTERING ELEMENT AND A SPECTRAL REFINING DEVICE INCLUDING THE SAME

The present invention relates to optical filters and more particularly filters having diffraction gratings for achieving a spectral refinement and ensuring a scanning in wavelength of a coherent light radiation emitted for example by an organic dye laser.

It is known that an optically excited dye spontaneously re-emits a fluorescence light the wavelength spread of which is of the order of a few hundreds of angstroms.

The introduction of such a substance associated with a dispersive system in a resonant cavity permits obtaining a laser radiation having the following two specific features:

(1) Possibility of tuning the wavelength of the radiation emitted by the laser to the fluorescence band of the dye.

(2) A spectral fineness depending on the degree of selectivity of the dispersive system.

The optical excitation of the dye may be achieved in two different ways:

(a) by means of the radiation delivered by another laser;

(b) by means of flash-lamps.

In the first case, the excitation laser may have a continuous emission (argon laser) or be pulse operated (ruby laser, nitrogen laser).

Spectral refining and tuning devices are known for an organic dye laser employing dispersive prisms.

As described in particular in an article in the Japan Journal of Applied Physics, 7, 179 (1968) by Yamaguchi G. Endo F. et al, in order to obtain a spectral tuning and refinement, one or more dispersive prisms are placed in the path of the light in the resonant cavity of a dye laser between the two mirrors of the cavity. The prisms produce angular selective deflections for the radiations of different wavelengths forming the spectrum of fluorescence of the dye.

The radiation emitted by the laser comprises only the spectral components of the beam perpendicular to the mirrors of the cavity.

A rotation of the total reflection mirror enables the wavelength of the radiation permitted by the laser to be varied.

In order to reduce losses by reflection to a minimum, the angles between the surfaces of the prisms and the direction of propagation of the beam are in the neighbourhood of the Brewster angle.

The major drawback of these devices is a variation in the direction of emission of the laser beam for wavelengths close to the edge zones of the fluorescence spectrum of a dye. Moreover, in certain cases emission of satellite lines is observed (F. C. Strome, J. P. Webb, Appln. Opt. vol. 10 No. 6—June 1971, p. 1348).

Another means of obtaining a radiation having high spectral fineness consists in introducing in the laser cavity at least one Fabry Perot standard element or interference filters. A device arranged in this way is described in the article of D. J. Bradley et. al. in the review J. Quantum Electron, QE-E (1968) 707.

The devices of this second type, in which there are employed one, two or often three Fabry Perot standard elements, give very good results but only permit ensuring a wavelength scanning in a limited band.

Devices are known also in which birefringent filters are employed.

The simplest of these devices comprises a birefringent plate the optical axis of which is parallel to its faces, said birefringent plate being placed between two polarizers the polarization directions of which are parallel to each other.

A device of this type appears to be well adapted for use with dye lasers delivering long pulses (several hundreds of nanoseconds or more) such as flash-pumped lasers or continuous emission lasers.

However, in the case of lasers pumped by pulses of the order of around ten nanoseconds or less, these devices are no longer selective enough and the wavelength tuning can only be partially achieved (Applied Optics, vol. 15, No. 2, February 1976—M. Okada et al).

Spectral tuning and refining devices employing a diffraction grating are also known.

The diffraction gratings usually employed comprise engraved parallel lines or grooves having a saw-tooth profile.

The different parameters of such a grating are:
N: the normal to the support plane of the network.
M: the normal to the plane of a facet.
$\alpha$: the angle of incidence of the beam to be processed.
$\alpha'$: angle of diffraction.

The angles $\alpha$ and $\alpha'$ are mesured from the normal N.
i: the angle of incidence of the beam to be processed.
i': the angle of diffraction.

The angles i and i' are measured from the normal M.
m: the pitch of the grating.
$\gamma$: blaze angle.

Bearing in mind the aforementioned data, a radiation having a wavelength $\lambda$ impinging on the grating at an incidence $\alpha$ is diffracted at an angle $\alpha'$ related to $\alpha$ by the equation:

$$\sin \alpha + \sin \alpha' = \frac{k\lambda}{m} \quad (1)$$

in which k is an integer termed the order of the grating.

The discriminating power of the grating relative to two linear and parallel radiations having wavelengths in the neighbourhood of $$\lambda_o + \frac{d\lambda}{2} \text{ and } \lambda_0 - \frac{d\lambda}{2}$$

is embodied by a parameter R termed the resolution of the grating given by the equation:

$$R = \frac{\lambda_o}{d\lambda} = k \frac{L}{M} = \frac{L}{\lambda_o} (\sin \alpha + \sin \alpha') \quad (2)$$

wherein L is the length of the grating illuminated in the direction perpendicular to the lines or grooves of said grating.

Diffraction gratings have been employed heretofore as filtering elements for the radiation emitted by dye lasers in Littrow configurations in which the angles $\alpha$ and $\alpha'$ are equal.

In such an arrangement, the radiation emitted by the dye laser only contains the spectral components of wavelength $\lambda$ satisfying the equation:

$$2 \sin \alpha = k \frac{\lambda}{m} \qquad (3)$$

The grating is therefore inclined relative to the direction of propagation of the beam or relative to the axis of the laser cavity so that the beam of wavelength $\lambda$ is diffracted at an angle $\lambda'$ equal to its angle of incidence $\alpha$.

The preceding equations show that, in order to obtain a radiation having a spectral spread which is as small as possible, the parameters k, m and L must be optimized.

In a dye laser, the divergence $\Delta \alpha$ of the beam emitted contributes to the spectral width. This contribution is given by the equation:

$$\Delta \lambda \alpha = \frac{\lambda}{\tan \alpha} \cdot \Delta \alpha \qquad (4)$$

The wavelength scanning of the radiation emitted by the laser is effected by rotation of the grating.

Diffraction gratings have been employed heretofore in various ways in spectral refining devices.

According to a first embodiment, there is placed in the cavity of a laser a container of dye which is disposed between the output mirror of the laser and a diffraction grating.

In this configuration, the parameter L is determined by the dimension of the beam.

To obtain a radiation of small spectral width, the parameters k and m must therefore be optimized.

If it is desired that the radiation emitted by the laser be tunable in the fluorescence band of a dye for a given grating (m fixed), it is not possible to exceed an order k, given by the equation (3), in respect of which two different spectral components of the fluorescence band of the dye can satisfy this equation.

The equation (2) is then written in the form of a condition having the limits:

$$\frac{\lambda o}{L \, \Delta \lambda} \leqq \frac{k}{m}$$

A grating operating with a high order k but having a small number of grooves per unit length (m large) may be employed. A grating operating with a low order k and having a large number of grooves (m small) may also be employed.

For example, in the case of a rhodamin 6G laser, the emission band of the dye is from 5,500 Å to 6,300 Å.

The equation (3) shows that whatever be the grating, it cannot be used in a Littrow configuration at an order k higher than 8.

In order that the radiation emitted by the laser can be tuned between 5,500 Å and 6,300 Å, it is found, by taking k=8, in the equation (3) that the number of grooves of the grating cannot exceed 396 lines per mm.

In order to scan the given spectral band, the grating must be inclined at an angle between 60.6° and 86.3°.

At 6,000 Å, for a beam having a diameter of 0.6 mm, the resolution is $R \approx 1,900$.

Consequently, as a first approximation, the radiation emitted by the laser contains only a single component capable of being tuned between 5,500 Å and 6,300 Å and having a spectral fineness of the order of $$\frac{\lambda o}{R} \approx 3 \, \text{Å}.$$

Unfortunately, the use of a diffraction grating under such conditions is limited by the behaviour of the grating to the laser flux which, owing to its concentration, rapidly deteriorates the grating.

In order to overcome this drawback, it has been contemplated to associate a magnifying system with the preceding system so as to avoid the burning of the surface of the grating and illuminate a larger number of grooves.

The magnifying system is inserted between the dye container and the grating.

This magnifying system consists either of an afocal system of lenses (Applied Optics, vol. 11, No. 4—April 1972, p. 895—T.W. Hänsch) or a prism at high incidence (Optical and Quantum Electronics—1975—11-5-119, D. C. Hanna et al).

The use of an afocal system produces considerable optical aberration which affects the optical quality of the beam and impairs its spectral fineness.

As concerns an arrangement employing a prism at high incidence, it results in considerable losses by reflection on the face of the prism which is highly inclined with respect to the beam. These losses are of the order of 71% for a beam whose polarization is parallel to the plane of incidence.

An object of the invention is to overcome the aforementioned drawbacks by providing a filtering device having a grating which ensures a good resolution but results in small losses by reflection.

According to the invention, there is provided a filtering element for a coherent light radiation comprising a diffraction grating placed in the path of the beam, wherein said grating is disposed with respect to the direction of the beam in such manner that the angle of incidence of the beam is at least equal to 80° and different from the angle of diffraction, the filtering element further comprising at least one additional optical element placed in the path of a component of the beam diffracted by said grating and adapted to return to the grating a part of the light of said component.

According to the invention, there is also provided a device for achieving a spectral refinement of a radiation emitted by a laser comprising a cavity containing a light amplifying medium and an output mirror of the laser, the said device comprising a filtering element of the type defined hereinbefore disposed in said cavity on the opposite side of said output mirror to the amplifying medium.

Further features of the invention will be apparent from the ensuing description with reference to the accompanying drawings which are given solely by way of example and in which:

FIG. 1 is a diagrammatic view of a laser cavity provided with a first type of optical filtering element according to the invention;

FIG. 2 is a diagrammatic view of a laser cavity provided with another type of optical filtering element;

FIG. 3 is a diagrammatic view of a laser cavity provided with a third type of optical filtering element according to the invention, and FIG. 4 is a diagrammatic view of a laser cavity provided with a fourth type of optical filtering element according to the invention.

It is known that the resolution of a grating is proportional to the number of grooves of the grating which are illuminated by a given beam.

Consequently, in order to obtain a good resolution, if the grating is employed in a Littrow configuration, a magnifying system has been employed heretofore.

According to the invention, instead of employing a magnifying system, the grating is placed in such manner that the incident beam perpendicular to the output mirror of the laser impinges on the grating at an angle of incidence α of high value.

In FIG. 1 there is shown mounted in a laser cavity an amplifying medium 1 comprising a container containing organic dye the sides 2 and 3 of which are inclined with respect to the direction of the beam 4.

Disposed adjacent the side 2 of the container 1 is a mirror 5 constituting the output mirror of the laser. Disposed on the other side of the container 1 with respect to the mirror 5, is a diffraction grating 6 which is so oriented that the angle of incidence α of the beam 4 is large, that is to say, in the neighbourhood of 90°.

The diffraction grating 6 comprises grooves 7 the density of which determines the resolving power.

A total reflection mirror 8 is placed perpendicular to the radiation of a wavelength λ° which is diffracted by the grating 6 and constitutes a component of the incident beam.

Upon a luminous excitation of the amplifying medium contained in the container 1, the light emitted by said medium in the direction of the diffraction grating 6 impinges on the latter at a large angle of incidence.

The different spectral components of this fluorescence radiation are reflected by the grating 6 at angles of diffraction α' given by the equation (1).

The mirror 8 placed perpendicular to the direction of this radiation of wavelength λ° diffracted by the grating 6, reflects this radiation along its incidence path and the grating 6 returns this reflected radiation into the dye container in which it undergoes a preferential amplification.

Under these conditions, there appears on the output mirror 5 a radiation of wavelength λ° the spectral fineness of which depends on the number of lines 7 of the grating 6 illuminated by the beam.

The total reflection mirror 8 is advantageously mounted to be adjustable in angular position with respect to the grating 6 so that the adjustment of the wavelength emitted by the laser is improved by turning the mirror 8 relative to an axis parallel to the grooves of the grating 6.

In order to illustrate the operation of the device according to the invention, there will be again considered the example of a rhodamin 6G laser the fluorescence emission band of which is between 5,500 Å and 6,300 Å.

It will be assumed that there is employed a diffraction grating whose number of lines per millimeter is 3,168 for the order k=1.

This grating is equivalent for the chosen example to a grating having 396 lines per millimeter employed with the order k=8.

The fluorescence radiation issuing from the dye container 1 perpendicular to the output mirror 5 of the laser, impinges on the grating 6 at an angle of 87.13° and, if it is assumed that this radiation has a circular section of 0.5 mm, a length L of the grating 6 of the order of 10 mm is illuminated.

By means of the total reflection mirror 8 placed perpendicular to the diffracted radiation of λ°=6,000 Å, the laser emits a radiation whose spectral fineness is of the order of $$\frac{\lambda_o}{R} \simeq 0.16 \text{ Å}.$$

The device shown in FIG. 2 comprises, in the same way as that shown in FIG. 1, a dye container 1 placed in the cavity of a laser, an output mirror 5 and a diffraction grating 6 placed at a high angle of incidence with respect to the direction of the beam of light 4.

The device further comprises a total reflection mirror 9 placed in the path of a radiation of wavelength λ° diffracted by the grating 6 so as to reflect this radiation toward the grating in a path 10 defining a Littrow configuration with the mirror 9 and the grating 6.

In the device shown in FIG. 2, the grating 6 is struck by the beam twice, but two separate gratings disposed in a suitable manner may also be employed.

Such an arrangement enables the spectrum of the radiation emitted by the laser to be still further refined owing to the fact that the diffraction grating intervenes successively as an angular discriminating element and as a Littrow configuration.

The device shown in FIG. 3 differs from that shown in FIG. 1 in that the mirror 8 is replaced by an additional diffraction grating 11 disposed with respect to the grating 6 in such manner as to form a Littrow configuration relative to a given wavelength of the radiation diffracted by the grating 6.

The device shown in FIG. 4 comprises, in the same way as the device shown in FIG. 3, an additional diffraction grating 12 which is disposed with respect to the diffraction grating 6 in such manner as to receive at a high incidence the radiation of a given wavelength diffracted by the grating 6 so as to spread the beam still more. It further comprises a total reflection mirror 13 placed perpendicular to the radiation from the additional grating 12.

The use of two gratings 6 and 12 consequently provides a wider radiation spread which is desired to be isolated and amplified in the amplifying medium 1.

The devices just described have the following advantages over the known devices.

They permit obtaining a very high resolution.

Indeed, if it is assumed, with reference to FIG. 1, that the dimension of the grating 6 perpendicular to the lines is 40 mm, placing the grating 6 in such manner that the angle of incidence of the beam 4 is 88.57° instead of 87.13° as in the example described hereinbefore, the radiation of 0.5 mm diameter issuing from the dye container illuminates all the lines or grooves of the grating. From the equation (2) there is obtained in this case a resolutin R≈126,720.

The width of the line emitted by the laser for a wavelength λ°=b,000 Å is then in the neighbourhood of 5×10⁻²Å.

Now, if a conventional device having a grating were employed, to obtain such a resolution, a magnifying system providing a magnification equal to 80 would have to be employed.

Thus the resolution is determined by the dimension perpendicular to the lines of the grating.

The device according to the invention permits obtaining a laser radiation emission in a wide spectral band.

The wavelength tuning property of the radiation emitted by the laser is calculated from the equation (1), taking into account, as in the cited examples, overlappings of the different orders.

In order to avoid this, it is desirable to employ a grating having the highest possible (k/m) with a larger number of lines and operating at a low order k.

Under these conditions, the losses due to diffraction in the different other orders are reduced to a minimum.

The device according to the invention permits changing the resolution, and consequently the width of the line emitted by the laser, by use of the same arrangement.

For this purpose, it is sufficient to modify the angle of incidence of the radiation on the grating so as to modify the number of lines of the grating covered.

As the rotation of the grating brings about a variation in the angle of diffraction of the considered spectral component, the total reflection mirror (mirror 8 of FIG. 1) must be rotated through an angle easily calculated from the equation (1), to obtain the radiation of given wavelength.

The losses by mirror reflection of the fluorescence beam which issues from the dye container and impinges on the grating may be reduced to a minimum by suitably calculating the blaze angle of the grating.

Having now described my invention what I claim as new and desire to secure by Letters Patent is:

1. A device for achieving a spectral refinement of a radiated beam emitted by a laser comprising means defining a cavity containing a light amplifying medium and an output mirror of the laser, and a flitering element disposed in the cavity on the opposite side of the output mirror to the amplifying medium, the filtering element comprising a diffraction grating placed in the path of the beam and disposed with respect to the direction of the beam in such manner that the angle of incidence of the beam is at least equal to 80° and different from the angle of diffraction, and at least one additional optical element placed in the path of a component of the beam diffracted by said grating for returning to the grating a part of the light of said component.

2. In a filtering element for a beam of coherent light comprising a diffraction grating placed in the path of the beam and at least one additional optical element placed in the path of a component of the beam diffracted by said grating for returning to the grating a part of the light of said component, the improvement wherein said grating is disposed with respect to the direction of the beam in such manner that the angle of incidence of the beam is at least equal to 80° and different from the angle of diffraction.

3. An element as claimed in claim 2 further comprising an additional diffraction grating, said additional optical element comprising a total reflection mirror disposed with respect to the first mentioned diffraction grating in such manner as to reflect at least once the radiation coming from said first mentioned diffraction grating onto said additional diffraction grating with which it forms a Littrow configuration.

4. An element as claimed in claim 3, wherein said additional diffraction grating is formed by an extension of the first-mentioned grating.

5. An element as claimed in claim 2, wherein said additional optical element comprises a diffraction grating which is disposed relative to the first-mentioned grating in such manner as to form with said grating a Littrow configuration for said component.

6. An element as claimed in claim 2, wherein said additional optical element comprises at least one additional optical element comprises at least one additional diffraction grating for spreading the component returned by the first-mentioned diffraction grating, and a total reflection mirror disposed perpendicular to the direction of the beam spread by said additional grating.

7. A filtering element as claimed in claims 4, 5, 6 or 2, wherein said additional optical element is mounted to be angularly moveable with respect to said diffraction grating for the incident beam.

8. A wavelength selector comprising:
a diffraction grating disposed at a grazing angle to an incident beam of light; and
first reflecting means disposed so as to receive a dispersive beam of light diffracted from said grating at a non-zero diffraction order along a reflection path angled with respect to said incident beam of light and to reflect it back to said grating in an opposite direction along said reflection path, thereby to provide a second diffraction of said incident beam.

9. A wavelength selector according to claim 8 and wherein said first reflecting means is rotatably mounted for providing selectable wavelength tuning.

10. A wavelength selector according to claim 8 in association with second reflecting means so as to define a laser cavity between said second reflecting means and said first reflecting means.

11. Apparatus according to either claim 8 or claim 10 wherein said first reflecting means comprises a grating.

12. Apparatus according to either claim 8 or claim 10 wherein said first reflecting means comprises a mirror.

13. A device including a laser and a wavelength selector according to claim 8 and wherein said diffraction grating is disposed to receive an incident beam of light from a laser cavity of said laser and is located therewithin.

14. A wavelength selector comprising:
a diffraction grating disposed at a grazing angle to an incident beam of light; and
first reflecting means disposed so as to receive a diffracted beam of light from said grating and to reflect it back to said grating, thereby to provide a second diffraction of said incident beam,
said first reflecting means comprising a mirror.

15. Laser apparatus including a wavelength selector comprising:
a diffraction grating disposed at a grazing angle to an incident beam of light;
first reflecting means comprising a mirror and disposed so as to receive a diffracted beam of light from said grating and to reflect it back to said grating, thereby to provide a second diffraction of said incident beam; and
second reflecting means associated with said first reflecting means so as to define a laser cavity between said first and second reflecting means.

* * * * *